Dec. 17, 1935.  A. VALENTIN  2,024,616
TREATMENT OF SHEETS OF FIBROUS MATERIALS
Filed Feb. 9, 1933   8 Sheets-Sheet 5

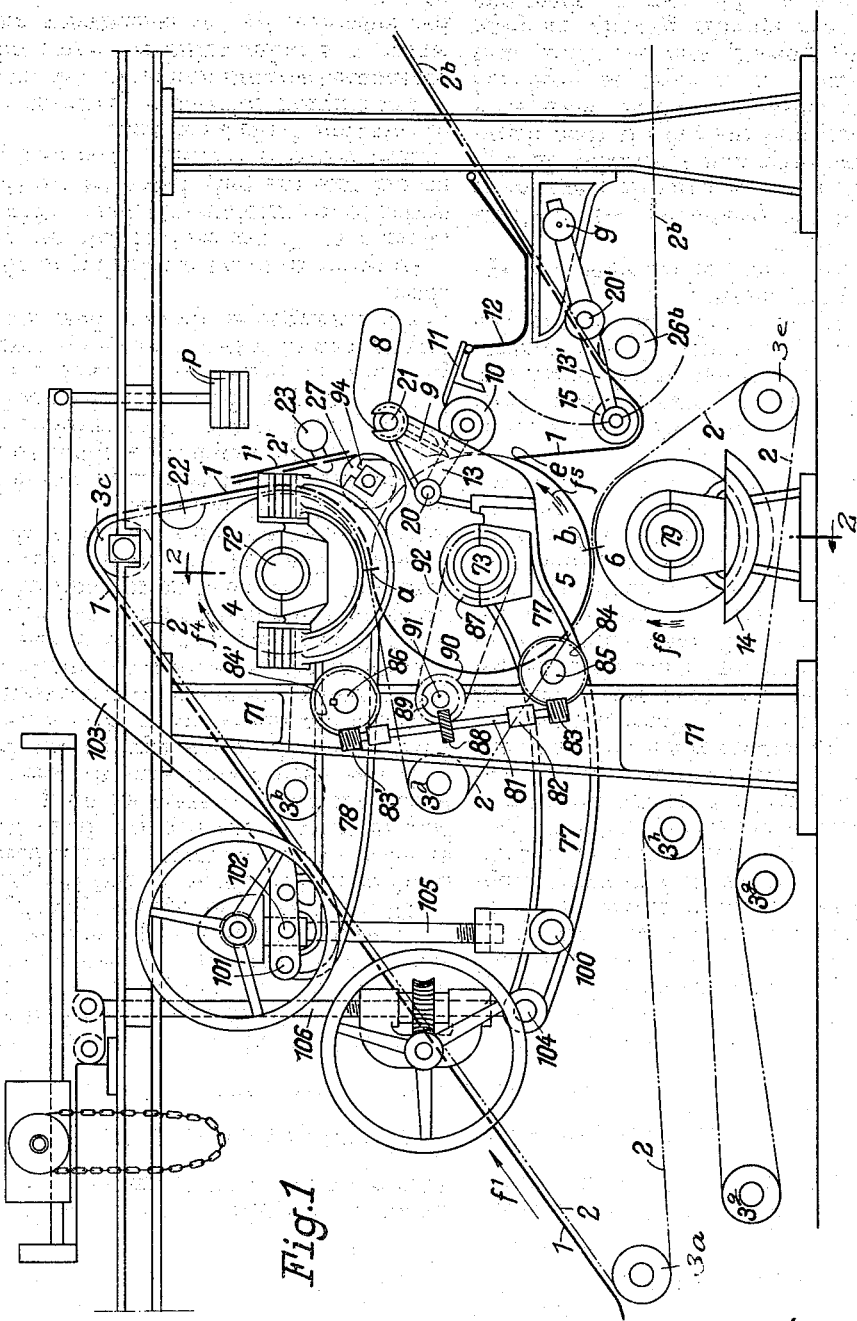

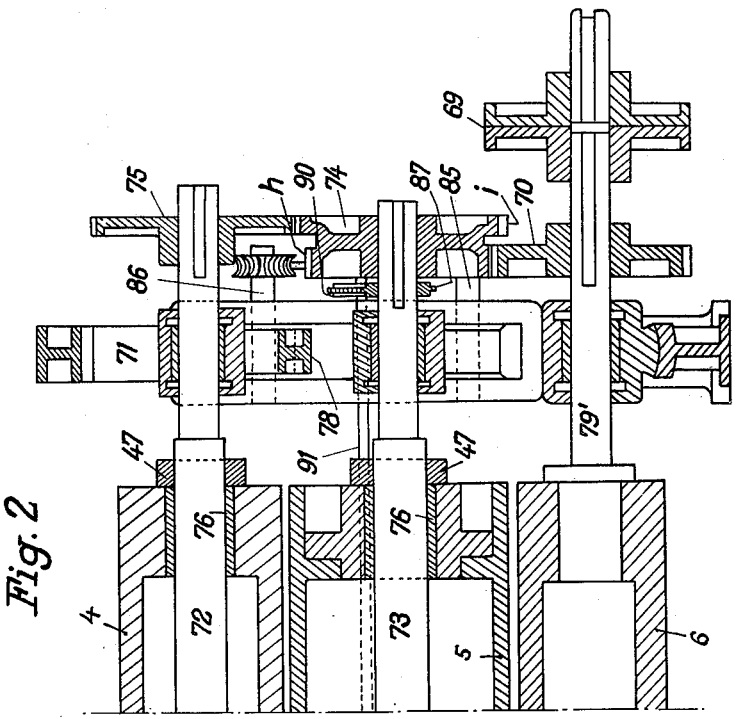
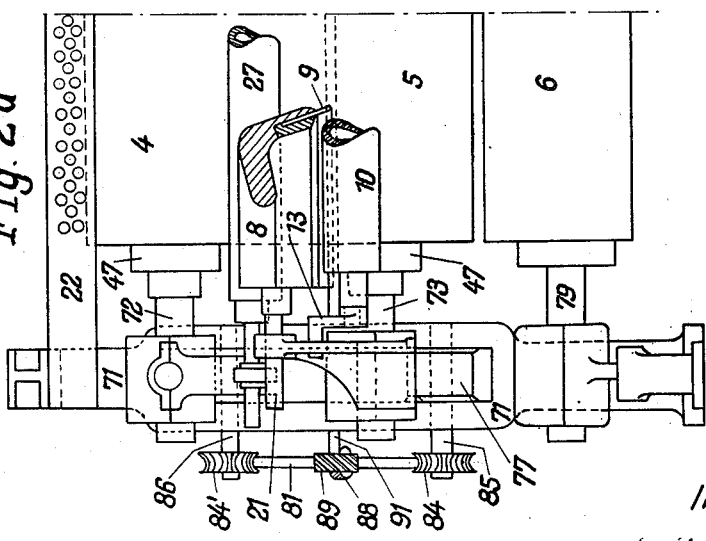

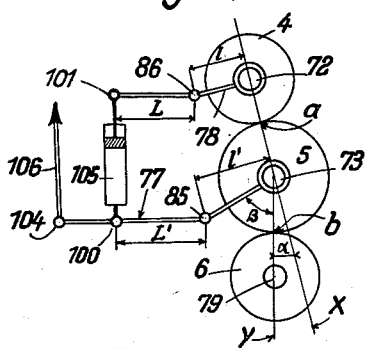
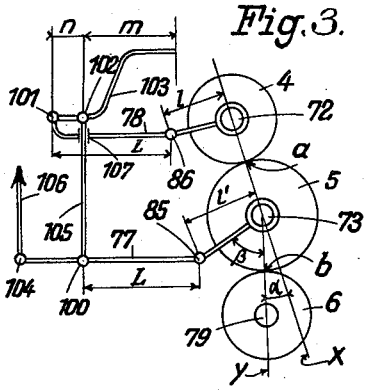
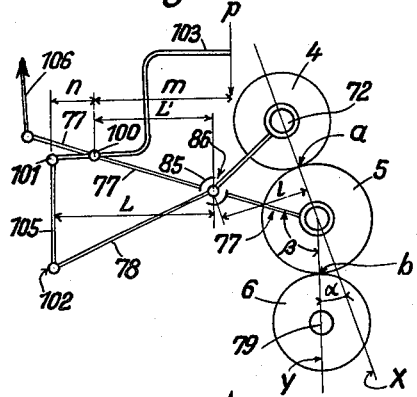
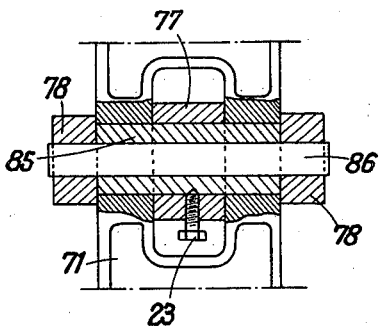
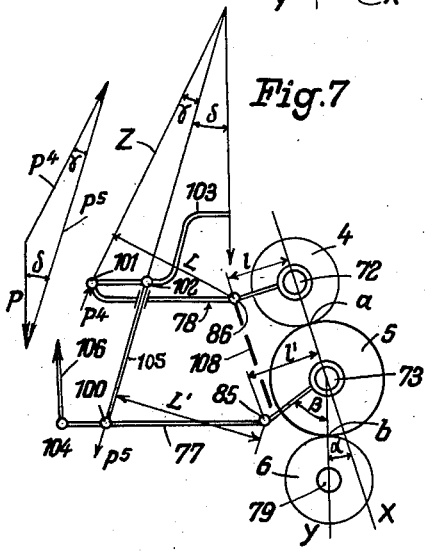
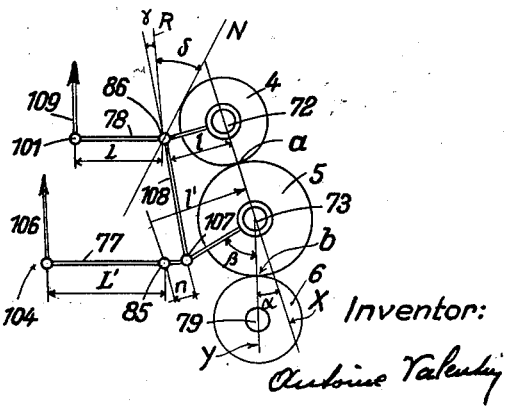

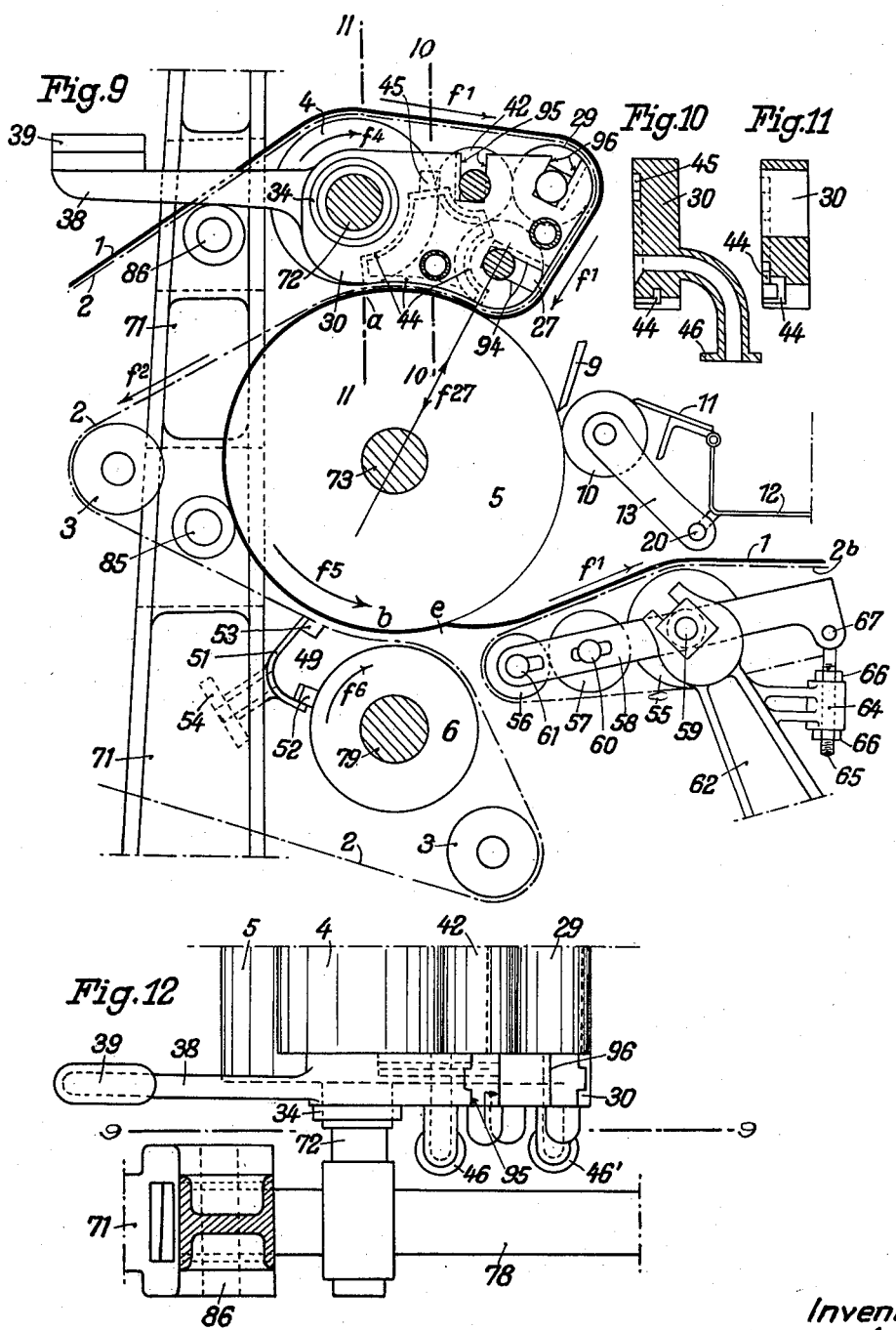

Inventor:
Antoine Valentin

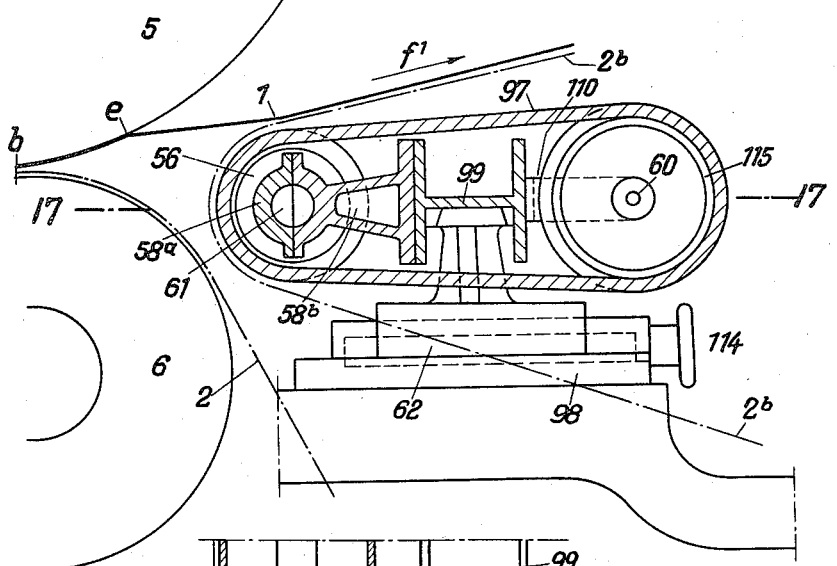
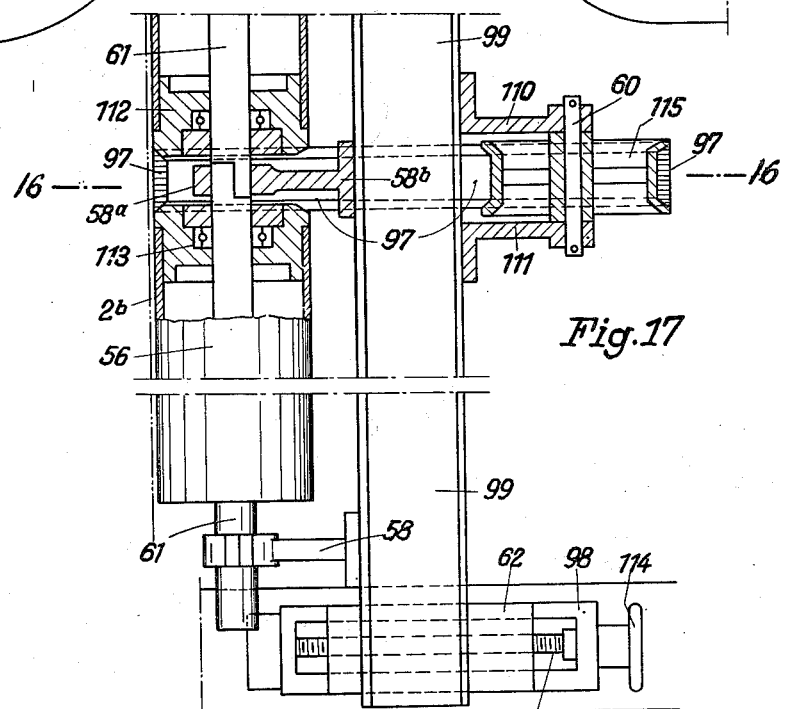

Dec. 17, 1935.  A. VALENTIN  2,024,616
TREATMENT OF SHEETS OF FIBROUS MATERIALS
Filed Feb. 9, 1933  8 Sheets-Sheet 7

Inventor:
Antoine Valentin

Patented Dec. 17, 1935

2,024,616

UNITED STATES PATENT OFFICE 2,024,616

TREATMENT OF SHEETS OF FIBROUS MATERIALS

Antoine Valentin, Valencia, Spain

Application February 9, 1933, Serial No. 656,020
In France February 10, 1932

22 Claims. (Cl. 92—49)

The present invention relates to the art of papermaking and has particular reference to that phase of the art which has to do with the removal or extraction of the water from the pulp or paper after it has been formed into a sheet or web on the papermaking machine.

In removing the water from the formed sheet or web, it is the general practice in the art to pass the material between one or more pairs of rolls which exert a pressure upon the travelling sheet or web. In the discussion to follow, the line of contact between the pair of pressing rolls will be referred to as the "pressure line".

An absorbent fabric usually termed a "felt" is generally interposed between one of the press rolls and the travelling web of paper. The felt serves the double function of distributing the pressure uniformly over the pressure line and of taking up a portion of the water squeezed out by the press rolls. As the web passes through the gap between the rolls, it adheres to the roll with which it has been in direct contact. To separate the web from the bare roll, it has been considered necessary in the prior art to subject the travelling web to tension.

The tension to which the web is subjected in order to separate it from the roll also serves to prevent the formation of folds in the web after it has passed beyond the press rolls. However, due to the moist condition of the web, the pull on the web causes an appreciable amount of elongation with a corresponding decrease in width. Furthermore, there is a decrease in the resistance of the web to tearing, folding, etc. The degree of injury to the web depends to a considerable extent upon a number of factors including the percentage of water in the web, the thickness of the material, the speed of the machine, the number of pairs of press rolls and the care with which the tension is regulated or controlled.

The continuous contact of one surface of the travelling web with the bare surface of one of the press rolls causes a marked difference in the character of the two surfaces. One surface is considerably softer than the other. In order to minimize the difference between the two surfaces, it has been proposed that both surfaces be brought into contact with the bare surfaces of the rolls. The difficulty involved in separating the travelling web from the rolls sets a practical limit to the number of pairs of press rolls which can be used.

The primary object of the present invention is to provide an apparatus for squeezing out a substantial portion of the water content of a moist sheet or web of fibrous material such as paper, which apparatus is simple in construction, simple and efficient in operation, and which obviates all the disadvantages of prior art constructions.

Another object is to provide such an apparatus having two or more lines of pressure, and in which the pressure at the various pressure lines can be regulated or controlled.

Another object is to provide such an apparatus in which a given variation in the pressure at one of the pressure lines serves to automatically vary the pressure at the other line in accordance with a predetermined rule.

Another object is to provide such an apparatus in which a sheet or web of material may be subjected to at least two consecutive pressing or squeezing operations with only one separation of the sheet or web from the bare surface of the roll.

Another object is to provide such an apparatus in which the water squeezed out is rapidly removed from the vicinity of the pressure line.

Another object is to provide such an apparatus which can be incorporated as a constituent element in a larger system; e. g. a system consisting of several sets of press rolls or a papermaking machine or a card board laminating machine in which a set of press rolls is an element.

Still another object is to provide a system in which the water removing apparatus is a constituent element.

In its broadest and simplest aspect the device of the invention consists of at least three press rolls arranged one above the other, and providing at least two pressure lines through which is to be conducted the moist sheet or web of material to be dried. One or more endless bands of absorbent material (felts) serve to conduct the moist sheet or web through the two pressure lines, the felts being preferably so arranged as to separate from the moist sheet or web as soon as the assembly of felt and moist sheet or web passes through the pressure lines. A wire mesh fabric may also be provided and arranged in such a way that both the wire mesh fabric and the felt are interposed between the moist sheet or web and one of the press rolls at the pressure line. Between the two pressure lines the moist web or sheet is in contact with the bare surface of one of the rolls and the sheet or web is not stripped from the bare roll until it has passed the second pressure line. This contact with the bare roll gives a higher finish to one side of the travelling web. If it is desired to give both sides the same finish, the web can be sent through a second press in such a way that the other side is in direct contact with the bare surface of the roll.

Behind one or more of the pressure lines may be positioned an element in contact with the surface of one of the press rolls to form a transverse gutter or channel to receive and carry off part of the water squeezed out at the pressure line. This element may advantageously take the form of a roller. The water caught in the gutter or channel may be allowed to run off at the ends of the gutter or may be removed by suction.

One of the press rolls, preferably the bottom roll, is mounted in the frame on a fixed shaft or trunnions and is provided wth positive driving means. The other press rolls may be loosely mounted on their shafts so as to be driven by frictional contact with each other and with the driven bottom roll. The shafts of the loosely mounted press rolls may be driven by interposed gearing from the shaft of the bottom roll.

The shafts of the loosely mounted press rolls are advantageously mounted so that the pressure at the pressure lines can be controlled or adjusted to suit individual requirements. To this end, they are supported in the ends of relatively long levers pivoted in the frame, means being provided to apply a desired amount of force to the levers. Connections may be provided between the two sets of levers so that the force transmitted from one pressure line to the other through one of the rolls is modified according to a predetermined rule.

The inventive concept or idea involved is capable of being embodied in various mechanical forms, several of which, for the purpose of illustrating the invention, are shown in the accompanying drawings, wherein:—

Figure 1 is a more or less diagrammatic representation in side elevation of a preferred form of apparatus utilizing three press rolls;

Figure 2 is a vertical transverse section through the press rolls on the line 2—2 of Figure 1 and looking in the direction of the arrows, only one end of each of the three press rolls being shown;

Figure 2a is an end view showing the end of each of the three press rolls which is not shown in Figure 2 and also showing other elements associated therewith;

Figure 3 is a reduced schematic or diagrammatic representation of the arrangement of the rolls and the levers of the preceding figures and showing the various lever arms;

Figure 4 is a view similar to Figure 3 of a modification;

Figure 5 is a view similar to Figures 3 and 4 of another modification;

Figure 6 is a transverse section through a form of pivotal connection which may be used for certain of the levers of Figure 5;

Figure 7 is a view similar to Figures 3, 4 and 5 of another modification;

Figure 8 is a view similar to Figures 3, 4, 5 and 7 of still another modification;

Figure 9 is a representation, partly in side elevation and partly in section on the line 9—9 of Figure 12, of a modified form of apparatus having three press rolls;

Figure 10 is a section on line 10—10 of Figure 9;

Figure 11 is a section on line 11—11 of Figure 9;

Figure 12 is a plan view of one end of the press rolls and associated elements of Figure 9;

Figure 16 is a view partly in transverse section on lines 16—16 of Figure 17 showing an arrangement for conducting the travelling web away from the press rolls;

Figure 17 is a cross-sectional view on line 17—17 of Figure 16;

Figure 13:
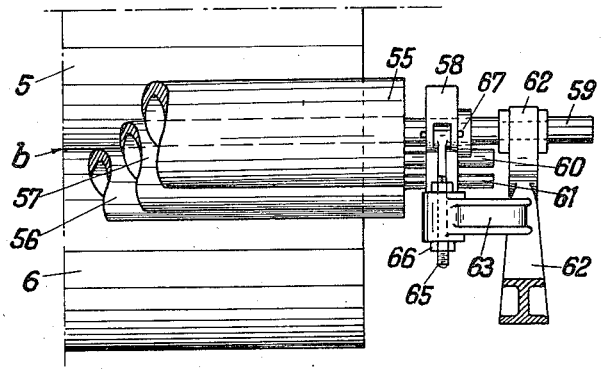
Figure 13 is an end view showing the three conducting rollers and associated mechanism of the modification shown in Figures 9 to 12 in their relationship to the press rolls.

Referring to the drawings in greater detail and more particularly to the embodiment of the invention illustrated in Figures 1, 2 and 2a, the web or continuous sheet of moist fibrous material which is to be deprived of most of its water content is denoted by the numeral 1. This web is supported for the greater portion of its travel upon an endless band 2 of absorbent material (felt). The felt is trained about and guided by a series of idler rolls 3a to 3h inclusive. The direction of travel of the web and felt is indicated by the arrow f' in Figure 1. The guide rolls may be freely rotatable or may be driven by belts, chains, etc.

The present embodiment has three vertically disposed press rolls indicated by the numerals 4, 5 and 6. The gaps between the rolls are somewhat exaggerated for the purpose of clearness, the pressure lines being indicated by a and b. It is to be noted that the endless band or felt is conducted from guide roll 3a obliquely upward over 3b, over and around 3c, down and partially around press roll 4 and through the gap between press rolls 4 and 5, away from the press rolls and over and around 3d, through the gap between press olls 5 and 6, away from the press rolls and around 3e, over 3f, around 3g, and around 3h back to 3a. If desired, the felt 2 and the web 1 which it supports may, instead of being conducted directly from guide roller 3c to press roll 4, be first conducted about guide roller 27 which is in direct contact with the middle press roll 5. The alternative positions of the web and conveying belt are indicated in Figure 1 by the numerals 1' and 2'. It is to be particularly noted that while passing around the press rolls, the travelling web 1 is in contact with the felt 2 only at the pressure lines and in the immediate vicinity thereof, the felt separating from the travelling web immediately after the assembly passes each of the pressure lines. The obvious advantage is that the dried web is kept away from the felt which has taken up part of the "squeezed out" water.

The press rolls 4, 5 and 6 should be of a size and of a material most suitable for the purposes of the invention, and may advantageously be of a construction similar to that of a wringer roller. These rolls may be surfaced with a textile or metallic fabric or may be provided with sleeves of textile or metallic fabric. The other rotary elements of the apparatus may be of similar construction. The surfaces of the press rolls and of the conveying band 2 should be such as to promote adhesion of the moist web thereto, in order that the movement of these elements should carry along the moist web. Suitable expedients may be employed to improve the adhesion of the moist web to the conveying surface. As examples of such expedients may be mentioned subjection of the conveying band to currents of air, heat, cooling or jets of steam. The press rolls as well as the rollers for guiding the conveying band may be heated in order to facilitate the removal of the water by pressure.

The upper press roll 4 is mounted upon the shaft 72; the middle press roll 5 is mounted upon the shaft 73 and the bottom roll 6 is mounted upon the two alined trunnions 79 and 79'. The trunnions 79 and 79' are supported in stationary bearings, whereas the shafts 72 and 73 are each mounted for adjustment so that the pressure at the pressure lines a and b can be varied. Each end of the shaft 73 of the press roll 5 is supported by means of a lever 77. The shaft 72 of the press roll 4 has each of its ends supported by a lever 78. Each of the two levers 77 is pivoted in the frame 71 of the apparatus at 85, while the two levers 78 are each pivoted at 86.

The pivots or spindles 85 and 86 may advantageously be so constructed as to enable them to be moved continuously during the operation of the machine. I prefer to impart to these elements a rotary motion. In order to provide for this motion, pivots 85 and 86 are each formed with gear wheels 84 and 84' which mesh with the worms 83 and 83' affixed to a common spindle 81. This spindle is driven from the shaft 73 of the press roll 5 in the following manner: The shaft 73 is provided with a sprocket wheel 87 and the spindle 81 carries a worm wheel 88. Trained about the sprocket wheel 87 and a second sprocket wheel 90 is a sprocket chain 92. On the same shaft with the sprocket wheel 90 is a worm wheel 89 which meshes with the worm wheel 88. The continuous movement of the pivots or spindles 85 and 86 minimizes stiffness at these points and renders regulation of the pressure at the pressure lines more sensitive.

To the free end of each of the levers 78 is pivotally connected a lever 103. The pivotal connection is designated as 101. At the free or outer end of each lever 103 is mounted a scale pan for the addition of weights P. Each lever 103 is also adjustably connected near its inner end to one of the levers 77 by means of an adjustable vertical rod 105. The vertical rod 105 is connected to the lever 103 by the bolt 100. The connections 100 and 102 are not fixed to the frame. Each lever 77 is also adjustably connected to the frame of the machine by means of an adjustable vertical rod 106 to which it is pivoted at 104. Each vertical rod 105 and 106 is provided with a handwheel for separating the press rolls when it is necessary to change the felt 2. The handwheels do not constitute a part of the present invention and will not be described.

There are various ways in which the three press rolls 4, 5 and 6 may be driven. I prefer to drive the lowermost roll 6 positively and to transmit the rotation of the roll 6 to the rolls 5 and 4 by frictional contact. To this end, I provide the trunnion or shaft 79' of the lower roll with a coupling 69 to connect the trunnion 79' with a driving shaft. The trunnion 79' is also provided with a gear wheel 70 which meshes with the teeth $h$ of gear wheel 74. The gear wheel 74 is keyed to the shaft 73 of the press roll 5 and has a second set of teeth denoted by the letter $i$. The shaft 72 of the uppermost press roll 4 carries a gear wheel 75 which meshes with the teeth $i$ of the gear wheel 74. Both press rolls 4 and 5 are loosely mounted on their shafts 72 and 73 and are kept from axial displacement by the abutments 47. The bearings and brasses for the two shafts are indicated by the numerals 76. Various speed regulating devices, friction clutches, sliding belts, etc. may be provided wherever thought necessary or desirable. The arrangement and combination of the elements hereinabove described are such that the forces necessary to overcome the various resistances are not completely transmitted by the web 1 or the felt 2.

From the foregoing, it will be understood that rotation of the shaft 79' in a clockwise direction by means of the pulley 69 will cause a clockwise rotation of the lowermost press roll 6. The rotation of the roll 6 turns the intermediate roll 5 by frictional contact in a counterclockwise direction and the roll 5 causes the uppermost roll 4 to turn in a clockwise direction also by frictional contact. At the same time the shafts 72 and 73 of the rolls 4 and 5 are rotated by means of gear wheels 74 and 75. Preferably the ratio between the gear wheels 74 and 75 is such that the shafts 72 and 73 will have a greater angular speed than the rolls 4 and 5.

Rotation of the press rolls causes the felt 2 to travel in the direction of the arrow $f'$, thus conveying the moist web 1 of paper or card board through the apparatus. The web 1 is carried over the first guide roller 3a obliquely over the rollers 3b and 3c and past the suction box 22 which serves to promote the adhesion between the web 1 and the felt 2 by sucking out the interposed air. The suction box is disposed on the opposite side of the felt 2 from the travelling web 1 so as to act upon the felt just before it reaches the pressure line a.

After the web passes the suction box 22 it is conducted either directly through the pressure line a or first around the guide roller 27 and then through the pressure line. The guide roller 27 is mounted in contact with the upper right hand side of the press roll 5 with its ends supported by the two levers 78 in slots 94. The roller 27 may be covered or surfaced with a pliable material such as leather, rubber, felt, etc. and bears upon the press roll 5 with its natural weight. If thought advisable, means may be provided for increasing the pressure of the roller 27 against the press roll 5. The contact of the roller 27 with the press roll 5 forms an open-ended channel or gutter extending transversely of the machine for receiving part of the water squeezed out at the pressure line a. This water flows away through the open outer ends of the channel or gutter. The rest of the water squeezed out at the pressure line a is taken up by the felt 2.

If the web is to be conveyed around the guide roller 27, a nozzle 23 may be provided as shown in Figure 1 to direct a stream of fluid under pressure against the travelling web and felt. This facilitates their being conducted about the guide roller 27.

Instead of the guide roller 27, a stripping knife may be provided to form a channel or gutter to the right of the pressure line a. The stripping knife may have a structure similar to that of the knife 9 shown in Figure 1.

The travelling web 1 and its supporting felt 2 are preferably separated after leaving the pressure line $a$, the felt passing around the guide roller $3d$ and away from the surface of the roll 5 and the travelling web 1 adhering to the roll 5 and being carried thereby to the pressure line $b$ where it is joined by the felt 2. At the line $b$ the travelling web 1 and felt 2 are again subjected to a squeezing or pressing operation, the water which is pressed out flowing down over the cylinder 6 and into the basin 14.

In order to prevent the formation of foam, bubbles, etc. during the pressing operation, jets of steam, or of compressed air or atomizers may be provided. The details of such devices form no part of the present invention.

The felt 2 and the travelling web of paper 1 separate from one another again immediately behind the pressure line $b$, as shown in Figure 1. The felt 2 is carried obliquely downward and around guide roller $3e$, while the web 1 is carried along by the intermediate press roll 5 to the point $e$ where it is stripped from the roll. The stripping of the web 1 may be accomplished manually or by means of compressed air or steam.

The web 1 after it is stripped is conducted around guide roller 15 onto a conveying belt $2b$ which carries it to another machine. The roller 15 is carried at the outer ends of a pair of levers 13' which are pivoted at 20' and counterweighted at $g$. The position of the roller 15 with respect to the roll 5 is such that the web 1 forms at point $e$ where it is being stripped from the roll 5 an acute angle. In this way tension in the web due to the stripping action is reduced and the formation of folds is obviated. In this connection, it may be stated that the roller 15 subjects the web 1 to a slight tension.

Means may be provided to keep the press roll 5 free of fibers and foreign particles which would otherwise adhere to the roll. One form of such device is shown in Figure 1 as having the body portion 8 and a knife 9. The device is pivoted at 21 and the free end of the knife is held against the periphery of the roll 5 so as to strip therefrom fibers and foreign particles. I may also provide a roller 10 between the pressure line $b$ and the knife 9. This roller is shown supported at the ends of arms 13. The arms are pivoted at 20 and the roller 10 bears with its weight against the roll 5. The roller 10 may be covered or surfaced with a soft material and may be provided with means for increasing its pressure against the roll 5. The roller may also be provided with means for causing it to rotate, but I prefer to have it rotated by frictional contact with the press roll 5. Positive rotation would be advantageous in cases where it is desired to have the roller continue rotating after the press rolls have stopped. The roller 10 also serves to remove fibers and particles from the press roll 5. A stripping device 11 and a receptacle 12 serve to keep the roller 10 clean.

From the foregoing description, it is clear that in the apparatus of the present invention the moist web is subjected to two consecutive squeezing operations (at pressure lines $a$ and $b$) with only one separation of the web from the bare roll. The only separation occurs at $e$ behind the second pressure line $b$. It will also be understood that the pressure at lines $a$ and $b$ can be varied whenever desired by the addition or subtraction of weights to the scale pans at the free ends of the two levers 103. The change in pressure at line $a$ is proportional to the change in weights at P. Were it not for the connecting rods 105 intermediate the two horizontal levers 77 and 78 the change in pressure at line $a$ would be transmitted substantially unaltered through press roll 5 to line $b$. In the following discussion it will be shown that the arrangement of levers renders it possible to modify the variation in pressure at line $b$ which would ordinarily accompany a given variation in pressure at line $a$.

Referring in this connection to Figure 3 which is a schematic or diagrammatic representation of the arrangement of the press rolls and levers of Figures 1 and 2, the lengths of the arms of each of the levers 103 are designated as $m$ and $n$, the line X represents the plane passing through the pressure line $a$ and the shafts 72 and 73, and the line Y represents the plane passing through the pressure line $b$ and the shafts 73 and 79. The distance from the pivot 86 to the direction of the force which acts on the pivot 101 is designated as L and the perpendicular distance between the pivot 86 and the plane X is indicated as l. The distance from the pivot 85 to the direction of the force which acts on the pivot 100 is denoted by L' and the perpendicular distance from the pivot 85 to plane X is indicated by $l'$. The angle between planes X and Y is denoted by $\alpha$ and the angle between plane Y and the lever arm connecting pivot 85 with the shaft 73 is denoted by $\beta$.

The forces which are operating in the direction of gravity will be considered as positive forces, while those operating against gravity will be considered as negative forces. The weights of the various parts of the apparatus will be disregarded.

From the foregoing considerations, it is thought to be evident that if a force P be applied to the end of each of the lever arms 103, a force equal to $$-P\frac{m}{n}$$

will be exerted at each of the fulcrums 101. Hence there will be a force equal to $$P\frac{mL}{nl}$$

exerted at each end of the shaft 72 acting in the plane X. The pressure across line $a$ ($Pa$) will, therefore, be equal to $$2P\frac{mL}{nl}.$$

There will also be a force acting along each of the connecting rods 105 equal to $$P\frac{(m+n)}{n}.$$

Due to this force there will be a force equal to $$-P\frac{(m+n)}{n}\frac{L'}{l'}$$

exerted at each end of the shaft 73 acting in the plane X or a force equal to $$-2P\frac{(m+n)}{n}\frac{L'}{l'}$$

exerted along the entire length of the shaft 73. There will also be transmitted from the pressure line $a$, a force equal to $$2P\frac{mL}{nl}$$

Hence the resultant force acting along the shaft 73 in the plane X will be equal to $$2P\frac{mL}{nl} - 2P\frac{(m+n)L'}{n\ l'} = 2\frac{P}{n}\left[\frac{mL}{l} - (m+n)\frac{L}{l'}\right].$$

The component of this force across the line $b$ ($Pb$) is equal to $$\frac{2P}{n}\left[\frac{mL}{l} - (m+n)\frac{L'}{l'}\right]\frac{\sin(\alpha+\beta)}{\sin\beta}.$$

In other words, the existence of the connecting rods 105 decreases the variation in pressure at line $b$ which would ordinarily accompany a given variation at line $a$ by $$2P\frac{(m+n)L'\sin(\alpha+\beta)}{n\ \ l'\ \sin\beta}.$$

It is thought to be obvious that by choosing suitable values for $l$, $l'$, L, L', $m$ and $n$, the variation of pressure across line $b$ corresponding to a given change in pressure across line $a$ may be made as small as desired. In fact the variation in pressure across line $b$ may be made equal to zero, or may be made counter to that across line $a$.

The form of apparatus disclosed in Figure 4 differs from that of the foregoing figures in that the levers 103 and the weights P are omitted and that each connecting rod 105 consists of a piston slidably mounted in a cylinder pivoted to the point 100. The cylinder contains a spring or fluid under pressure and the pressures across lines $a$ and $b$ can be varied by adjusting the position of the piston in the cylinder. The following formulas indicate the relationship between variations in pressure across the two lines $a$ and $b$, P denoting a change in pressure at the fulcrums 100 and 101:—

$$Pa = 2P\frac{L}{l}$$

$$Pb = 2P\frac{L\sin(\alpha+\beta)}{l\ \sin\beta} - 2P\frac{L'\sin(\alpha+\beta)}{l'\ \sin\beta} = 2P\left[\frac{L}{l} - \frac{L'}{l'}\right]\frac{\sin(\alpha+\beta)}{\sin\beta}.$$

The embodiment diagrammatically illustrated in Figure 5 differs from that of Figure 3 in that the pivots 85 and 86 coincide. Each lever 103 is pivoted at 100 to the corresponding lever 77 and at 101 to the connecting rod 105 which is in turn pivoted to the lever 78 at 102. In this embodiment the distances $l$ and $l'$ are equal. The following formulas express the relationship between variations in the pressures across lines $a$ and $b$:—

$$Pa = 2P\frac{mL}{nl}.$$

$$Pb = \frac{2P}{nl}[mL - (m+n)L']\frac{\sin(\alpha+\beta)}{\sin\beta}.$$

In Figure 6 is illustrated one form of pivotal connection for the levers of Figure 5. The pivot 85 is in the form of a hollow spindle rotatably mounted in the frame 71. The pivot 86 is in the form of a cylindrical rod rotatably supported within the hollow spindle 85 by means of a screw 23. The levers 78 are secured to the spindles 86 in any desired manner.

The embodiment of the invention diagrammatically illustrated in Figure 7 differs from that of Figure 3 merely in that the connecting rods 105 are inclined. The angles which the connecting rod 105 makes with the force P and with the component of P along line Z are designated as $s$ and $\gamma$. The other reference characters are the same as in the preceding figures. The following formulas express the relationship existing between a variation in the pressure across line $b$ and a given variation across line $a$:—

$$Pa = 2P\frac{L\sin s}{l\sin\gamma}$$

$$Pb = 2P\left[\frac{L\sin s}{l\sin\gamma} - \frac{L'}{l'}\frac{\sin(\gamma+s)}{\sin\gamma}\right]\frac{\sin(\alpha+\beta)}{\sin\beta}.$$

In the embodiment illustrated in Figure 8, the lever 103 is omitted and the connecting rod 105 between pivots 100 and 102 is replaced by a rod 108 connecting pivot 86 of lever 78 with lever 77 at a pivot denoted by 107. Pressure is applied to the system at pivot 101 of lever 78 by means of a rod 109. In this modification, the axles or spindles 85 are fixed to the stationary frame while the other axles or spindles have imparted to them some definite shifting movement which may be produced in any desired manner as by means of linkages. The connecting rod 108 may be elastic or rigid and may be adjustable in length.

In Figure 8, N indicates a line normal to the line of shift of the spindles 86. The various lever arms and perpendicular distances as shown in this figure are indicated by $l$, $l'$, L, L', and $n$. If a force P is applied to each of the fulcrums 101 by means of connecting rods 109, it will have a normal component upon each end of the shaft 72 equal to $$P\frac{L}{l}.$$

The resultant of P and $$P\frac{L}{l}.$$

is indicated on Figure 8 as R and the angles which it makes N and the upper extension of a line passing through link 108 are indicated by $s$ and $\gamma$. The component of R along the extension of 108 is equal to $$R\frac{\sin s}{\sin(\gamma+s)}.$$

The following formulas express the relationship between variations of pressure across lines $a$ and $b$:—

$$Pa = 2P\frac{L}{l}$$

$$Pb = 2P\left[\frac{L}{l} - R\left(\frac{\sin s}{\sin(\gamma+s)}\right)\frac{n}{l'}\right]\frac{\sin(\alpha+\beta)}{\sin\beta}.$$

From the formulas derived in connection with the modifications shown in Figures 4, 5, 7 and 8, it is clear that by varying the various lever arms and distances, the variations in the pressure across line $b$ can be made to follow the rule laid down in reference to the embodiment of Figure 3; namely, that the variation in pressure across line $b$ can be decreased to as small a value as desired, and may even be made counter to the variations in pressure across line $a$.

As indicated in Figure 7 by means of the dash line 108, both connecting rods 105 and 108 may be utilized in the same construction. If in such construction, the connection between lever 77 and the pivot 86 is invariable, then it follows that the pressures across lines $a$ and $b$ are substantially independent of each other and that the elements 77, 78, 103, 105 and 108 constitute a system in which a change in internal pressures, such as across line

*a*, has no effect upon the external connections of the system.

The form of apparatus illustrated in Figures 9 to 13 inclusive differs from that of Figures 1, 2 and 2a chiefly in the arrangement of the devices for taking up the air and water pressed out of the travelling web or sheet, and also in the direction in which the supporting felt and travelling web are conducted after they are separated from the press rolls. In Figures 9 to 13 are shown only those parts of the machine which are necessary in the description of the foregoing differences.

Referring more specifically to Figure 9, the three press rolls are shown as being supported in frame 71 and providing the two pressure lines $a$ and $b$. The directions of rotation of the three rolls are denoted by arrows $f^4$, $f^5$ and $f^6$. The direction taken by the moist web 1 is indicated by the arrow $f'$ and that of the supporting felt by the arrow $f^2$. It will be noted that the web 1 and the felt 2 are conducted over the top of the upper press roll 4 and about the rollers 29 and 27 to the upper surface of the intermediate press roll 5 and through the pressure line $a$. The felt 2 then separates from the web 1, the web continuing around in direct contact with the bare surface of the roll 5 to the pressure line $b$, where it is again superposed upon the felt 2 which supports it in its passage through the pressure line $b$.

Each of the rollers 27, 29 and 42 rotates in bearings which are slidably mounted in the lateral members 30. The members 30 may be metallic plates rotatable on the shaft 72 of the cylinder 4. The members 30 are kept from slidable movement by means of collars 34 (see Figure 12) and the rollers 27, 29 and 42 which are mounted between them. Means may be provided for adjusting the closeness of contact between the lateral plates 30 and the ends of the rollers 27, 29 and 42. In order to regulate the pressure exerted by the plates 30 on the felt 2, the roller 27 is mounted so as to be readily adjustable to and away from the roll 5 in the direction of the arrow $f^{27}$. As shown in Figures 9 and 12 the plates 30 may be provided with levers 38 weighted as at 39 to regulate the pressure of the system upon the travelling web.

The joints between the plates 30 and the members 4, 5, 27, 29 and 42 may be rendered tight by any suitable packing means. The packing means may be hydraulic. To this end, the inside surfaces of the plates 30 may be provided with communicating grooves 44 (see Figures 10 and 11) for a liquid circuit. The liquid may circulate through the grooves and be maintained under a pressure by communication with a receptacle containing liquid positioned above the line of contact between the roll 4 and roller 42. The numerals 45 in Figure 10 indicate the passage-ways between the receptacle and the grooves 44.

The numerals 46 in Figure 9 and 46' in Figure 12 denote tubes through which the water squeezed out at the pressure line $b$ is drawn out by suitable suction devices from the trough formed by the roller 27 and the press roll 5.

A trough for carrying off the water squeezed out at pressure line $b$ may be provided as shown in Figure 9 by means of a curved wall 51 having abutment ledges 52 and 53 contacting with the press rolls or the felt. The members 52 and 53 may be in the form of rollers that are rotated by frictional contact with the rolls 5 and 6. The lateral ends of the trough may be closed as by means of walls 49. A tube or pipe 54 connected to a pump may serve to carry off the water reaching the trough.

It is to be noted that the suction in the vicinity of the pressure lines $a$ and $b$ serves not only to remove the water which is squeezed out of the travelling web of paper, but also to remove some of the air entrapped in the felt.

The travelling web of paper is stripped from the intermediate press roll 5 at the point c and is conducted to the endless band 2b which is carried by the three rollers 55, 56 and 57. Rollers 56 and 57 are rotatably supported in brackets 58 which are connected to the standard 62 and pivoted to the trunnions 59 of the rollers 55. The trunnions 59 are supported by the standards 62. The brackets 58 are connected to the standards 62 in such a manner that the angle of inclination of the assembly of rollers 55, 56 and 57 can be varied at will. To this end each standard 62 has a horizontally extending bracket 64 having a vertical screw-threaded aperture receiving a screw-threaded rod 65. Each bracket 58 is pivotally connected to the top of one of the rods 65. Each rod 65 can be adjusted vertically in its bracket 64 by means of nuts 66, thus raising or lowering one end of the bracket 58.

The standard 62 may be mounted so as to permit it to be shifted in the same or opposite direction to that of the travelling web 1. Such a construction is illustrated in Figures 16 and 17. Referring now to these figures, it will be seen that roller 56 consists of several co-axial parts arranged side by side on the shaft 61 which is held by brackets 58 and 58b projecting from the girder 99. The shaft 61 also consists of a number of co-axial parts arranged side by side and connected together within the aperture 58a in the bracket 58b. The girder 99 is supported on slides 62 which can be shifted on guide members 98 by means of screw-threaded spindles 65a provided with the handwheels 114.

Secured to the girder 99 at spaced intervals are a number of brackets 110 and 111 on which are mounted spindles 60. On these spindles are rotatably mounted grooved disks or wheels 115. Trained about the grooved disks or wheels 115 and the roller 56 are a series of endless belts which may be of trapezoidal cross-section. The roller 56 may be provided with grooves to receive the belts 97. Preferably the grooves are not provided directly in the roller 56 but in the members 112 and 113 which serve to unite the several parts of the roller 56. The conveying band 2b is carried by the belts 97.

Figure 14:
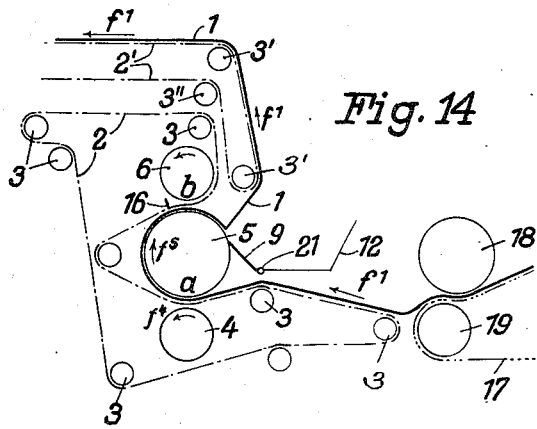
Figure 14 is a schematic or diagrammatic representation of a modification of the form of apparatus illustrated in Figures 9 to 13.

In the embodiment of the invention illustrated in Figure 14, there are three press rolls 4, 5 and 6 providing two pressure lines $a$ and $b$. The order of the rolls is reversed so that the lowermost roll is designated as 4 and the uppermost roll as 6 and the web 1 travels in a generally upward direction as indicated by the arrow $f'$. The web 1 is conducted to the endless felt 2 by means of the conveying belt 17 which is trained about the lower roller 19 of a set of contacting rollers 18 and 19. The guide rollers 3 guide the endless band 2 through the apparatus. The moist web 1 is conducted through the pressure line $a$, around the intermediate press roll 5, through the pressure line $b$ and is then stripped from the roll 5 and conducted vertically upward in the direction $f'$ by the endless band 2' which is trained about the guide rollers 3' and 3''. The water squeezed out across line $a$ may be permitted to flow down over the lowermost press roll 4 while that squeezed out across line $b$ may be cut in a gutter or trough formed by the member 16. The member 16 may take the form of a roller and may be adjustable against the felt. Suction means may be provided in the vicinity of the pressure lines.

The reference numeral 9 in Figure 14 denotes a stripping device which may be used to keep the roll 5 free of fibers and particles. The stripping device is shown pivoted at 21 to a receptacle 12 for collecting the fibers picked up by the stripping device.

Figure 15:
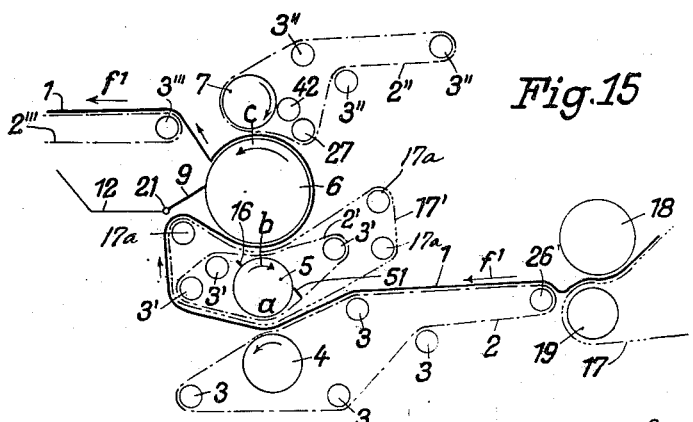
Figure 15 is a schematic or diagrammatic representation of a form of the invention utilizing four press rolls.

The apparatus of Figure 15 has four press rolls 4, 5, 6 and 7 and, hence, three pressure lines $a$, $b$ and $c$. There are three endless felts for supporting and conducting the moist web 1 through the apparatus. The first felt 2 is trained about the guide rollers 3 and the lowermost roll 4, passing through the pressure line $a$. The second felt 2' is trained about the guide roller 3' and intermediate roll 5 and passes through the pressure lines $a$ and $b$. The third felt 2" is trained about the guide rollers 3" and 27 as well as about the uppermost roll 7, passing through the pressure line $c$. A wire mesh fabric in the form of an endless band 17' is trained about the guide rollers 3' and 17a and the press roll 5, passing through the pressure lines $a$ and $b$ between the felt 2' and each of the rolls 4 and 6. In other words, the wire band surrounds or encircles the endless felt 2'. It is to be noted that the wire band 17' and the felt 2' are in contact with each other only where the web 1 is in contact with the wire band; i. e. to the left of the pressure lines $a$ and $b$.

The bottom roll 4 may be in the form of a foraminous cylinder so that the adhesion of the travelling web 1 to the felt 2 is promoted. The roll 5 may be provided with devices 16 and 51 for collecting and removing the water squeezed out at the pressure line $b$. The rolls 6 and 7 may be provided with the contacting rollers 27 and 42 to form a gutter or trough for receiving and carrying off the water squeezed out at the pressure line $c$.

From the foregoing description of Figure 15, it will be understood that the moist web 1 in its passage through the lowermost pressure line $a$, is kept out of contact with roll 4 by the felt 2 and is kept out of contact with the roll 5 by the wire fabric 17' and the felt 2', that in its passage through the pressure line $b$, the web 1 is kept out of contact with the roll 5 by the wire fabric 17' and the felt 2' and is in direct contact with the bare roll 6 and that the web 1 remains in direct contact with the roll 6 until it passes through the uppermost pressure line $c$. After it is stripped from the roll 6 behind the pressure line $c$, the web 1 is carried off in the direction $f'$ by the conveying belt 2'''. The conveying belt 2''' is carried by the guide rollers 3'''.

Figure 18:
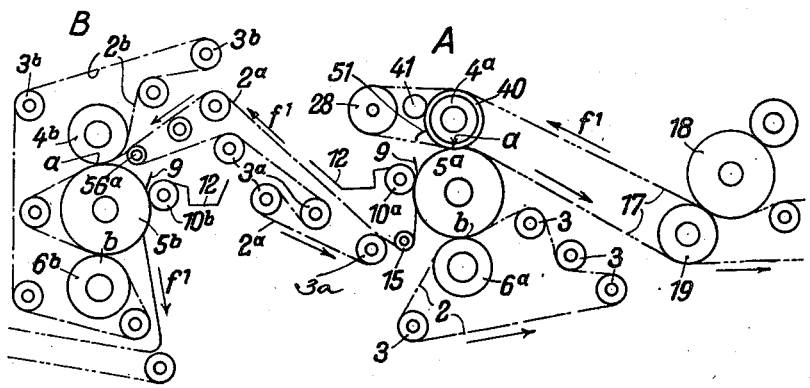
Figure 18 is a schematic or diagrammatic representation of a papermaking machine incorporating the press rolls of the present invention.

In Figure 18 is diagrammatically illustrated an embodiment of the invention in which are utilized two sets of three press rolls, the rolls of the first set A being designated as 4a, 5a and 6a and those of the second set B being designated as 4b, 5b and 6b. The moist web 1 of paper is conducted to and around the felt sleeve 40 of the uppermost roll 4a of the first press A by means of an endless conveying belt of wire mesh fabric 17 which is trained about the rollers 19 and 28 and the sleeve 40. A roller 41 may be positioned in contact with the sleeve 40 to keep it clean. Means may be provided at 51 below the roller 41 to conduct away the water squeezed out at line $a$.

The web 1 as it passes through the pressure line $a$ of the press A is pressed between the wire 17 and the bare surface of the roll 5a. The web 1 is carried around by the roll 5a to the pressure line $b$ where it is subjected to a second pressing between the bare surface of the roll 5a and the felt 2 which is trained about the lowermost roll 6a and the guide rollers 3. The web 1 continues around part way with the roll 5a and is stripped off and conducted to the second press B by means of the felt 2a which is trained about the guide rollers 3a and 56a.

The arrangement of the elements of press B are similar to that of Figure 1 and need not be described. It is to be noted that the use of two presses as shown in Figure 18 renders it possible to subject each side of the web to pressure against the bare face of one of the rolls, so that both sides of the web have the same finish. However, the web may be conducted through the apparatus in such a manner that the same side is maintained against the bare rolls, resulting in a web having pronounced differences in finish on its two surfaces.

Figure 19:
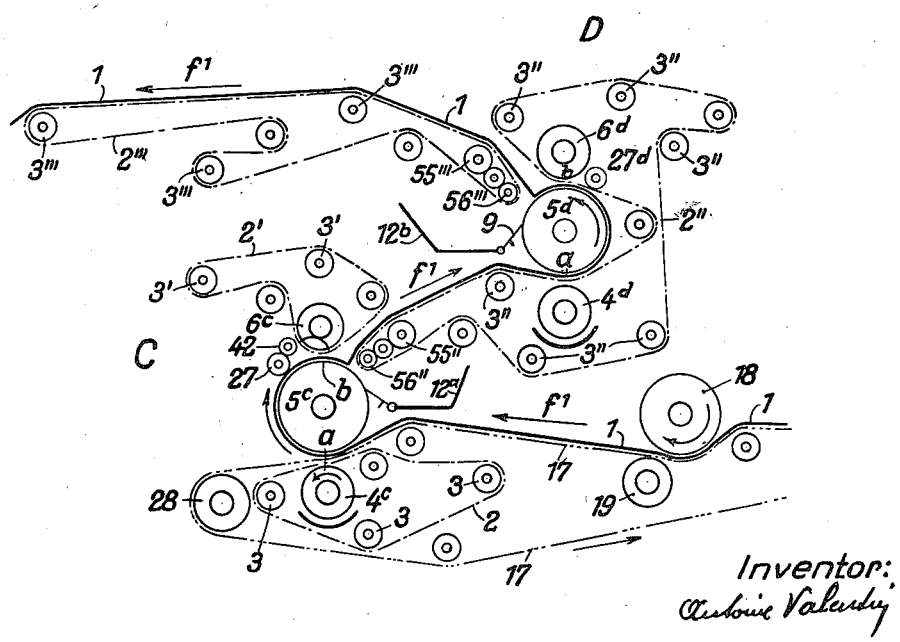
Figure 19 is a schematic or diagrammatic representation similar to Figure 18 of another arrangement of press rolls and papermaking machine.

In Figure 19 is diagrammatically illustrated another form of construction in which two sets of press rolls are combined into one apparatus. The moist web 1 is conveyed to the pressure line $a$ of the first set C of press rolls by means of the wire mesh belt 17 which is trained about the roller 19 and 28 and between the two lower rolls 4c and 5c. The wire 17 encircles the felt 2 which is trained about the guide rollers 3 and which passes through the pressure line $a$ between the wire 17 and the roll 4c. The roll 4c may be provided with a felt covering in which case the felt 2 may be dispensed with. After passing through the pressure line $a$ the web 1 is carried to the pressure line $b$ by the bare surface of the middle roll 5c to which it adheres. The uppermost roll 6c may be a suction roll. Between the web 1 and the upper roll 6c may be interposed a felt 2' which is trained about the roll 6c and a series of guide rolls 3'.

The web 1 is stripped from the middle roll 5c behind the pressure line $b$ and is taken up by the belt 2" which carries it through the pressure line $a$ of the second set of press rolls D. The belt 2" is trained about a series of guide rollers 3", 55" and 56" and passes through both pressure lines. The web 1 after leaving the pressure line $a$ is carried around by the middle roll 5 with which it is in direct contact through the pressure line $b$ and onto the belt 2''' which carries it away from the draining apparatus. The belt 2''' is carried by the guide rollers 3'''.

Means may be provided at the pressure lines $b$ in both presses to form troughs for receiving and carrying off the water which is squeezed out. In the press C such a trough is formed by the contacting rollers 27 and 42 while in press D the roller 27d contacting against the middle roll 5d forms the trough. Means may be provided to adjust the pressure of the roll 27d against the roll 5d. The roll 6d may be provided with a felt covering.

From the foregoing description of the embodiment of the invention disclosed in Figure 19 it is clear that in press C, the upper surface of the web 1 adheres to the bare surface of the cylinder while in press D it is the under surface that comes into contact with the bare cylinder. Obviously, the presses may be so arranged that the same side of the web is brought into direct contact with the bare surfaces of the intermediate roll.

Figure 20:
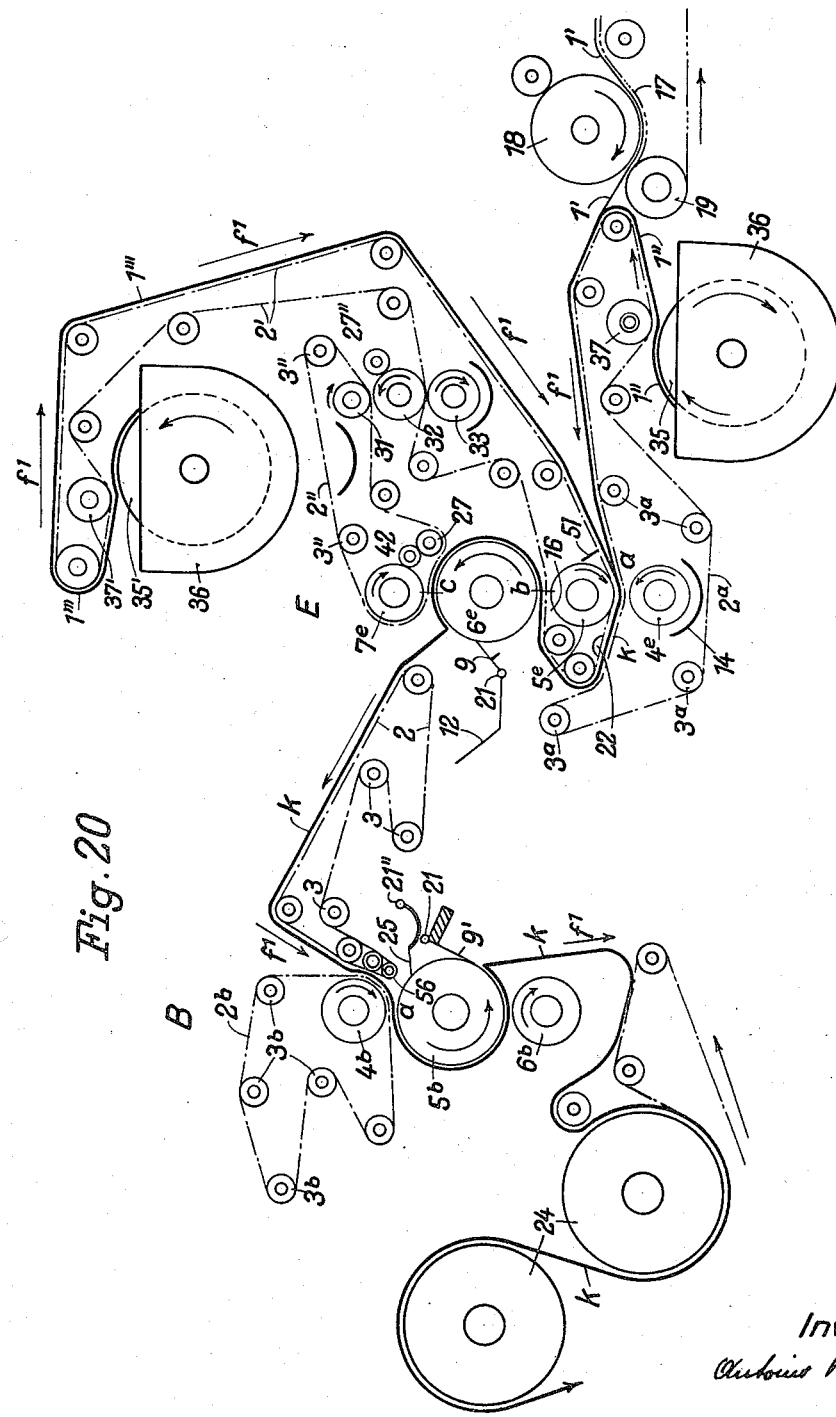
Figure 20 is a schematic or diagrammatic representation of a card board making machine incorporating the press rolls of the present invention.

Referring finally to Figure 20 in which is illustrated a card board machine, B and E are two sets of press rolls. The set B has the three rolls 4b, 5b and 6b and the two pressure lines a and b, while the set E has four rolls designated as 4e, 5e, 6e and 7e and the three pressure lines a, b and c.

The card board is formed by laminating the three webs l', l" and l'''. The web l' is conveyed by a wire mesh belt 17 to the belt 2a which is trained about the guide rollers 3a and passes through the pressure line a of the press E. The web l" is shown as originating on the cylinder 35 in the vat 36 and is conducted about the belt 2a where it is united with the web l'. The belt 2a carries the two layers l' and l" to the pressure line a where they are united to the third layer l'''. The third layer is shown as coming down from the cylinder 35' in the vat 36'. The laminated web k composed of the layers l', l" and l''' is conducted through the pressure line a between the two felts 2a and 2', past the suction device 22, through the pressure line b, between the felt 2' and the roll 5e, around the bare surface of the roll 6e, through the pressure line c between the felt 2" and the roll 6e, and onto the belt 2 which conveys the laminated card board to the second press B. The three contacting rollers 31, 32 and 33 positioned below the vat 36' serve to press out the water taken up by the felts 2' and 2" in their travel through the pressure lines.

The foregoing embodies the essential thought and concept of my invention, but it is to be understood that its details may be modified in various ways, replaced by other details or combined with other concepts without departing from the spirt and scope of the following claims, in which I am endeavoring to cover all novelty inherent in the foregoing disclosure.

I claim:

1. A draining press for continuous or individual sheets of fibrous material, comprising, in combination, at least three pressing cylinders forming between them at least two gaps through which the sheets are to be led consecutively in order to be subjected to pressure, supporting and conveying bands for the sheets, and means arranged in the proximity of said bands and forming together with them spaces for the reception of the liquid pressed out of the moist sheets, substantially as set forth.

2. In a draining press for sheets of a fibrous material, comprising, in combination, a set of cylinders forming gaps between them, means for conducting the sheets through the consecutive gaps in order to subject them therein to pressure exerted by the cylinders, one of these latter being firmly affixed to an axle supporting it and the other cylinders being supported loosely upon their appertaining axles, and means for rotating the first-mentioned axles with an angular speed which is different from the angular speed of the first-mentioned axle, for the purpose set forth.

3. In a draining press for continuous or individual sheets of a fibrous material, especially such as employed for the manufacture of paper and card-board, in combination, a set of at least three cylinders leaving between them gaps for the passage of the sheet that is to be subjected to pressure between the cylinders, a supporting and conveying band for the sheets, and rollers of comparatively small diameter arranged near one of said cylinders, as well as near said band, the arrangement of said rollers being such that vibrations of the band with the sheet thereon are obviated, substantially as set forth.

4. A draining press consisting of at least three superposed contacting press rolls, said rolls providing at least two pressure lines, through which pressure lines is to be conducted a moist web to be drained, a belt of absorbent material trained about the lowermost press roll and passing through the lowest of said pressure lines to conduct said moist web through said pressure line, a belt of absorbent material trained about an intermediate press roll and passing through the lowest and intermediate pressure lines and a wire mesh fabric encircling said second mentioned belt of absorbent material and passing through the lowest and intermediate pressure lines.

5. A draining press for sheets or webs of fibrous material comprising at least three press rolls arranged one above the other and providing at least two pressure lines through which is to be conducted the moist sheet or web of material to be drained, a felt passing through both pressure lines but being out of contact with the intermediate press roll except at the pressure lines, whereby the sheet or web to be dried in passing through the press is kept out of contact with both the bottom and top rolls and is carried by the intermediate roll from one pressure line to the other with one of its sides in direct contact with the bare surface of said intermediate roll and whereby said sheet or web is subjected to two pressing operations with but one stripping from the bare surface of the intermediate roll.

6. The device as defined in claim 5, in which one of said press rolls is a suction roll.

7. The device as defined in claim 5, in which the top roll is a suction roll.

8. A draining press for sheets or webs of moist fibrous material consisting of at least three superposed, contacting press rolls providing at least two pressure lines through which is to be conducted the sheet or web of moist material to be drained, means to vary the pressure at the first of said pressure lines, the variation of the pressure at said first pressure line being transmitted through one of the press rolls to the second pressure line, and means to modify the variation of pressure which is transmitted to the second pressure line in accordance to a predetermined rule.

9. A draining press for sheets or webs of moist fibrous material consisting of at least three superposed, contacting press rolls providing at least two pressure lines through which is to be conducted the sheet or web of moist material to be drained, means to vary the pressure at the first of said pressure lines, the variation of the pressure at said first pressure line being transmitted through one of the press rolls to the second pressure line, and means to decrease to any desired extent the variation of pressure which is transmitted to the second pressure line.

10. A draining press for sheets or webs of moist fibrous material consisting of at least three superposed, contacting press rolls providing at least two pressure lines through which is to be conducted the sheet or web of moist material to be drained, the lowermost of said press rolls being mounted on a shaft which is fixed in the supporting frame and the other shafts being each mounted on the end of a separate lever pivoted to the frame and connections between said levers for modifying the change in pressure at one of said pressure lines corresponding to a given change in pressure at the other of said pressure lines.

11. A draining press for sheets or webs of moist fibrous material consisting of at least three superposed, contacting press rolls providing at least two pressure lines through which is to be conducted the sheet or web of moist material to be drained, the lowermost of said press rolls being mounted on a shaft which is fixed in the supporting frame and the other shafts being each mounted on the end of a separate lever pivoted to the frame, said levers being pivoted together.

12. A draining press for sheets or webs of moist fibrous material consisting of at least three press rolls arranged one above the other and providing at least two pressure lines through which is to be conducted the sheet or web of moist material to be drained, one of said press rolls being keyed to its supporting shaft and the other press rolls being mounted loosely upon their shafts.

13. A draining press for sheets or webs of moist fibrous material consisting of at least three press rolls arranged one above the other and providing at least two pressure lines through which is to be conducted the sheet or web of moist material to be drained, one of said press rolls being keyed to its supporting shaft and the other press rolls being mounted loosely upon their shafts, and means to rotate one of said shafts and means to transmit the rotation of said shaft to the other shafts, the loosely mounted press rolls being rotated by frictional contact with each other and with the keyed press roll.

14. A system comprising two draining presses as defined in claim 5, said draining presses being arranged in series, and means interposed between said presses for inverting the sheet or web in its passage from one press to the other, whereby in the second press the opposite side of the sheet or web is in direct contact with the bare surface of the intermediate press roll as it is conducted from one pressure line to the other.

15. A draining press consisting of four superposed, contacting press rolls, said rolls providing three pressure lines, through which pressure lines is to be conducted a moist web to be drained, a belt of absorbent material trained about the bottom press roll to conduct said moist web through the lowest pressure line, a wire mesh fabric trained about the second press roll from the bottom through the lowest and intermediate pressure lines and a belt of absorbent material trained about the top press roll and passing through the uppermost pressure line, the web to be drained being conducted by the first mentioned belt through the lowest pressure line against said wire mesh fabric and being conducted through the intermediate pressure line between the wire mesh fabric and the bare surface of the third roll from the bottom and being carried around by said last mentioned roll to the uppermost pressure line with one of its sides in direct contact with the bare surface of said last mentioned roll.

16. In the draining press as defined in claim 15, wherein there is provided a belt of absorbent material trained about the second press roll from the bottom, said belt being encircled by the wire mesh fabric.

17. In combination with two superposed, contacting press rolls of a draining press, said rolls providing a pressure line between them through which pressure line is to be conducted a moist web to be drained, a belt of absorbent material and a wire mesh fabric passing through said pressure line, said wire mesh fabric being interposed between the belt of absorbent material and the bare surface of one of said press rolls and serving to conduct the moist web through the pressure line in direct contact with the bare surface of the last mentioned press roll.

18. The device as defined in claim 5 which is provided with means for removing fibers and foreign particles from the intermediate pressure roll along a line below the line along which the sheet or web is stripped from the surface of said roll.

19. The device as defined in claim 5 which is provided with means for removing fibers and foreign particles from the intermediate pressure roll along a line below the line along which the sheet or web is stripped from the surface of said roll, said means consisting of a stripping blade pressed against the intermediate roll, a roller pressed against the said roll somewhat below the blade and a second stripping blade to remove fibers and foreign particles from the surface of the roller.

20. A draining press for sheets or webs of fibrous material comprising at least three press rolls arranged one above the other and providing at least two pressure lines through which is to be conducted the moist sheet or web to be drained, a wire mesh fabric passing through the upper pressure line, and a felt passing through the lower pressure line, whereby the sheet or web to be dried in passing through the press is kept out of contact with both the bottom and top roll and is carried by the intermediate roll from one pressure to the other with one of its sides in direct contact with the bare surface of said intermediate roll and whereby said sheet or web is subjected to two pressing operations with but one stripping from the bare surface of the intermediate roll.

21. A draining press for sheets or webs of fibrous material comprising at least three press rolls arranged one above the other and providing at least two pressure lines through which is to be conducted the moist sheet or web to be drained, a felt passing through the upper pressure line, and a wire mesh fabric passing through the lower pressure line, whereby the sheet or web to be dried in passing through the press is kept out of contact with both the bottom and top roll and is carried by the intermediate roll from one pressure to the other with one of its sides in direct contact with the bare surface of said intermediate roll and whereby said sheet or web is subjected to two pressing operations with but one stripping from the bare surface of the intermediate roll.

22. A draining press consisting of four superposed, contacting press rolls, said rolls providing three pressure lines, through which pressure lines is to be conducted a moist web to be drained, a belt of absorbent material trained about the top press roll and passing through the uppermost pressure line, a belt of absorbent material trained about the bottom press roll and passing through the lowermost pressure line and a wire mesh fabric trained about one of the intermediate rolls and passing through two of the pressure lines.

ANTOINE VALENTIN.